Jan. 17, 1939. C. C. BENNETT 2,144,010
PORTABLE DYNAMOMETER
Filed Oct. 5, 1936 2 Sheets-Sheet 2
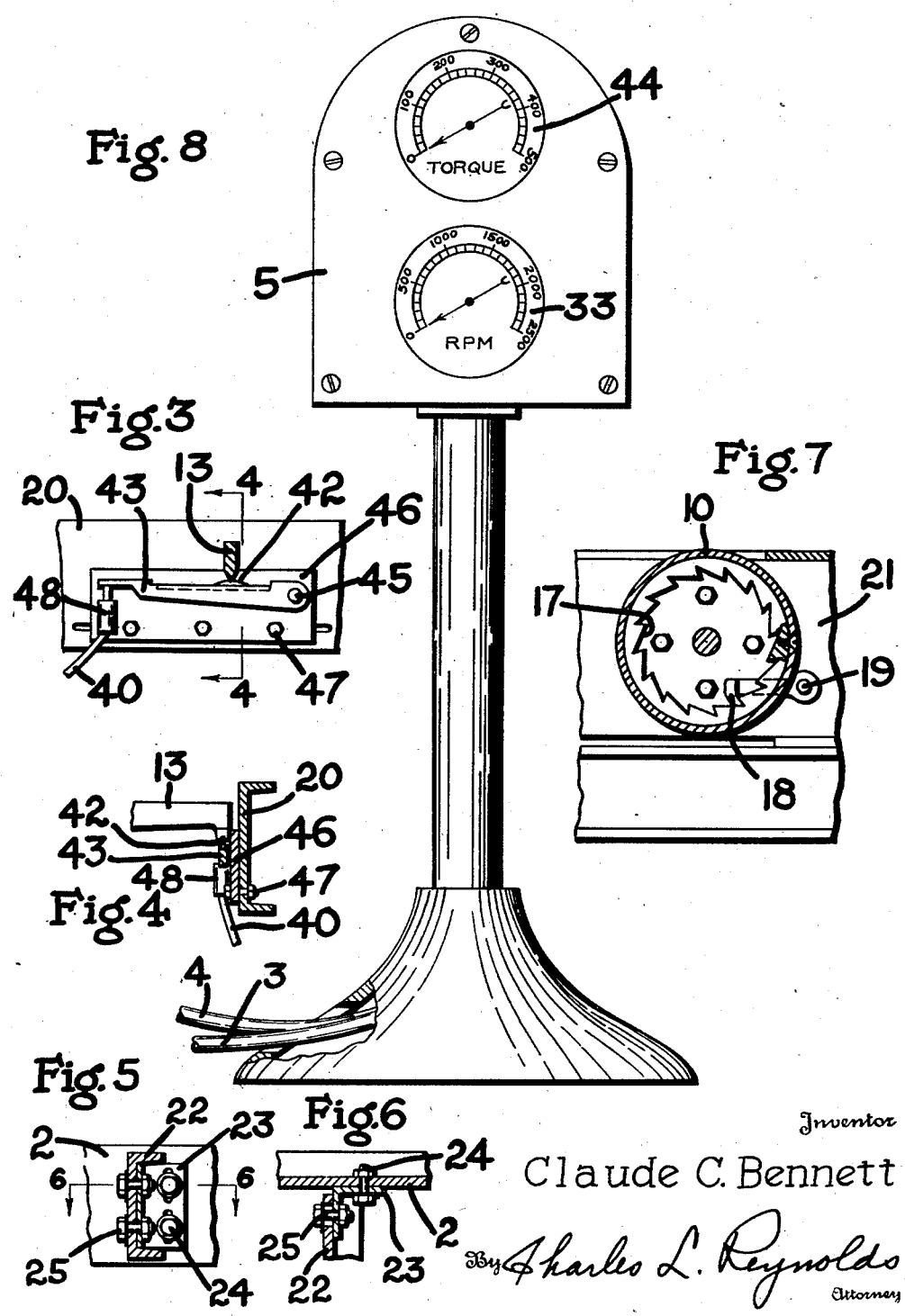
Inventor
Claude C. Bennett
By Charles L. Reynolds
Attorney Patented Jan. 17, 1939

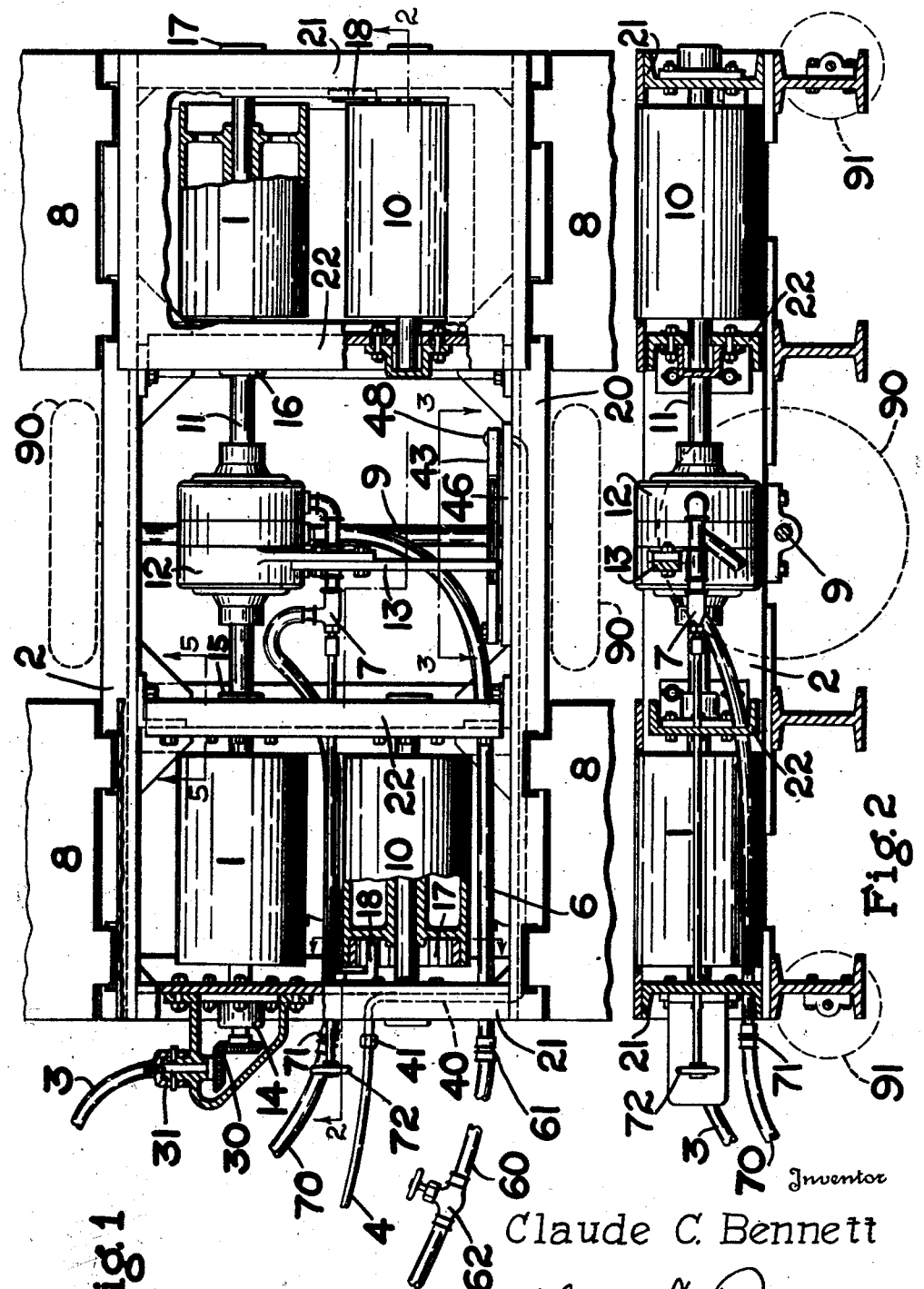

2,144,010

UNITED STATES PATENT OFFICE 2,144,010

PORTABLE DYNAMOMETER

Claude C. Bennett, South Bend, Ind., assignor to A. E. Feragen, Inc., Seattle, Wash., a corporation of Washington Application October 5, 1936, Serial No. 104,046

5 Claims. (Cl. 265—24)

My invention concerns a device for testing the power of automobile engines, and is of the type wherein the driving wheels of an automobile rest in driving engagement with spaced rolls operatively connected to drive a dynamometer, preferably of the hydraulic absorption type, thus by the production of torque and pressure, indicated upon a suitable gauge, and by counting of the revolutions of the roll shaft, indicated upon a tachometer, to permit calculation of the power developed by the automobile engine driving these driving wheels.

Such a power tester is disclosed in my copending applications Serial Nos. 84,273, filed June 9, 1936, Serial No. 86,123, filed June 19, 1936, and in my companion application for a Heavy-duty dynamometer, Serial No. 118,187, filed December 30, 1936.

The devices disclosed in my applications referred to are, from their nature, large heavy devices intended and suited only for permanent installation, and because of their cost, necessarily but few will be employed as compared to the total number of automobiles requiring testing. This makes necessary that the automobile to be tested be driven to the point of installation.

It is one of the objects of the present invention to devise a machine which, by reason of elimination of all except essential parts and gauges, and by proper divorcement of the indicating mechanism from the power absorption mechanism, the entire device may be made mobile or portable, and may be made relatively inexpensively, to the end that such devices may be made in larger numbers, and may be readily transported from place to place, quickly set up, and be made available for testing of automobiles without the necessity of the automobile coming to a fixed installation. Thus, for example, the present device may be employed at filling stations, and as a means for testing the claims of superiority of any given motor fuel, and after tests conducted at one station, it may be transported readily and readily set up at a different station, belonging perhaps to the same chain of stations, to test automobiles which do not habitually patronize the first station.

The present device, too, being comparatively inexpensive, may be manufactured in quantities to permit a widespread chain of stations to operate a number of such testing devices in different parts of their trade territory.

The device is also adaptable to the use of flying squadrons of officials testing various instrumentalities of an automobile, and moved from place to place over a given territory, as for instance from one county to another within a state, for the purpose of eliminating faulty equipment from the roads.

It is another object to provide, in connection with a hydraulic absorption dynamometer, particularly one for use where space is limited, to provide means enabling the use of a short torque arm and for multiplying the pressure developed thereby, and also to provide mechanism which will enable adjustment of the torque or pressure indications, so that all such dynamometers, regardless of minor inaccuracies in manufacture, will read alike under the same conditions.

It is a further object to provide in such a power tester means for ready adjustment of a part of the framework, the better to align four bearings which must be properly aligned to prevent absorption of power in the bearings.

With these and other objects in mind, as will appear hereafter, my invention comprises the novel machine as a whole, and the novel parts thereof, and their relative combination and arrangement, all as shown in the accompanying drawings, and as is more fully disclosed and claimed in this specification.

In the accompanying drawings I have shown my invention embodied in a typical form such as is now preferred by me.

Figure 1 is a general plan view of the power tester, the indicator stand being omitted.

Figure 2 is a section transversely of the machine, as indicated by the line 2—2 of Figure 1.

Figure 3 is a detail elevation of a part of the power transmission or torque-indicating mechanism, taken from the viewpoint indicated by the line 3—3 of Figure 1, and Figure 4 is a transverse section therethrough on the line 4—4 of Figure 3.

Figure 5 is a detail section taken on the line 5—5 of Figure 1, and Figure 6 is a section through the same on the line 6—6 of Figure 5.

Figure 7 is a detail section on the line 7—7 of Figure 1, illustrating ratchet mechanism to permit an automobile to be backed off the tester.

Figure 8 is an elevation, with parts broken away, of the indicator stand.

For supporting an automobile to be tested I employ two rolls 1 spaced apart to receive the opposite driving wheels of the automobile, and cooperating with each of these is a roll 10, parallel to its corresponding roll 1, and spaced therefrom sufficiently to cradle the driving wheels. The rolls 1 are secured upon a shaft 11, upon which is supported a dynamometer, preferably of the hydraulic absorption type. Since such dynamometers are in themselves old in the art, and a preferred form is illustrated in detail in my application Serial No. 84,273, referred to above, I have not deemed it necessary to illustrate this in detail, and only the casing 12 of the dynamometer is illustrated, it being understood that this casing is hung on the shaft 11 to oscillate thereabout, and that there is a rotor (not shown) secured upon the shaft 11 and rotatable therewith within the casing 12. A torque arm 13 extends laterally from the oscillatable casing 12.

This part of the device is supported in a suitable frame consisting of the end bars 2 and 20, the side bars 21 which are permanently secured together, and intermediate bars 22 extending between the end bars 2 and 20 and adjustable with respect thereto. For instance, and as shown in detail in Figures 5 and 6, an angle bracket 23 at each end of the intermediate bars 22 is adjustable vertically by means of the bolts and slots 24 with respect to the end bar, as 2, and is likewise adjustable longitudinally by means of the bolts and slots 25 with respect to the intermediate bar 22. The purpose of this is to permit proper alignment of the several journals 14, 15, 16 and 17 of the roll shaft 11, regardless of inaccuracies which may occur during the construction of the frame as a whole. The rolls 10 are journaled each in a side bar 21 and in the adjoining intermediate bar 22, as is best seen in Figure 1, the journals being adjustable relative to the frame.

Connected to an end of the roll shaft 11 is a drive 30 for a flexible shaft 3. This terminates in a coupling at 31, whereby the flexible shaft, which is connected to a tachometer 33 upon a stand 5, may be disconnected when the device is to be transported from place to place.

The torque arm 13 is suitably connected to a pressure gauge 44 which indicates the torque developed within the dynamometer 12. This connection is through a hose 4 coupled at 41 to a tube 40 carried by the frame, so that by disconnecting at 41 and at 31 the stand 5 is completely separable from the remainder of the device, and can be readily transported.

The torque arm 13 is shown as bearing upon a slide 42 bearing upon an arm 43, pivoted at 45 upon a plate 46, which is adjustable by means of the bolts 47 operating in suitable slots in the end bar 20, as is best seen in Figures 3 and 4. The end of the cross arm 43 bears upon a pressure plunger working within a cylinder 48, to which is connected the pressure tube 40 previously referred to. By adjustment of the plate 46 to vary the leverage of the end of the torque arm 13 upon the crossarm 43, the leverage, and consequently the indication given at 44, may be suitably varied to place all such instruments in accord, regardless of inaccuracies of manufacture or other maladjustments.

Liquid is supplied to the interior of the dynamometer through a pipe 6 terminating in a hose coupling at 61. A hose 60 communicating past a valve 62 with any suitable source of liquid, as a water tap, supplies and controls the ingress of fluid to the dynamometer casing. Its discharge is likewise controlled past a valve 7, preferably located close to the dynamometer, and a hose 70 may conveniently lead therefrom to a suitable drain, this being disconnectable at the coupling 71. An extension handle 72 is provided for the control of the valve at 7.

Suitable removable ramps 8 are provided whereby an automobile may be run upon the frame to bring its driving wheels to rest, cradled between the respective rolls 1 and 10. These ramps are easily removable, and may be transported upon the frame itself. The frame is transportable from place to place by securing upon an axle or spindles 9 wheels 90, which raise the frame above the ground and enable it to be transported from one location to another as a trailer. Small removable wheels 91 guard the corners of the frame against engagement with the roadway. The stand 5 with its gauges and the connecting hose 4 and flexible shaft 3 may be carried upon the frame or upon the vehicle which acts as a tractor for the frame.

To enable an automobile to be backed off the frame I provide, in conjunction with both of the rolls 10, a ratchet device such as is shown in Figure 7, for instance, ratchet teeth 17 engageable by a dog 18, pivoted upon the frame at 19. During testing the dog ratchets freely over the teeth, but as the automobile backs off, tending to turn the rolls 10 in the opposite direction, the dogs lock them.

What I claim as my invention is:

1. A power tester for automobiles comprising a mobile frame, an hydraulic absorption dynamometer mounted thereon, means to control the supply of liquid to and through the dynamometer, rolls mounted in the frame, to be engaged by the driving wheels of an automobile being tested, and operatively connected to drive the dynamometer, torque indicating means, means to indicate speed of rotation, means on the frame movable in response to torque developed in the dynamometer and operatively connected to the torque indicating means, means operatively connecting the rolls and the means to indicate speed of rotation, removable ramp means securable to said frame to enable the driving wheels of the automobile to roll into driving engagement with the rolls, and ratchet means engageable with a roll to permit substantially unimpeded forward rotation of the rolls, and to prevent rearward rotation thereof, whereby the automobile may be backed off the roll.

2. A power tester for automobiles comprising a roll shaft, two rolls secured thereon and spaced apart to engage the opposite driving wheels of an automobile under test, to rotate the roll shaft, a power absorption device mounted upon said shaft, to be driven therefrom, a roll disposed parallel to each of the first-mentioned rolls, to cradle therewith the driving wheels, means to indicate the torque absorbed by said power absorption device, means to indicate the speed of the roll shaft, and a frame supporting the roll shaft and the cradling rolls, comprising two end bars and two side bars secured together, and two bars intermediate the side bars and extending between the end bars, the roll shaft being journaled in the two side bars and the intermediate bars, and each cradling roll being journaled in a side bar and in the adjoining intermediate bar, and means to adjust the intermediate bars relatively to the remainder of the frame, for alignment of the roll shaft journals.

3. A power tester for automobiles comprising a roll shaft, two rolls secured thereon and spaced apart to engage the opposite driving wheels of an automobile under test, to rotate the roll shaft, a power absorption device mounted upon said shaft, to be driven therefrom, a roll disposed parallel to each of the first-mentioned rolls, to cradle therewith the driving wheels, means to indicate the torque absorbed by said power absorption device, means to indicate the speed of the roll shaft, and a frame supporting the roll shaft and the cradling rolls, comprising two end bars and two side bars secured together, and two bars intermediate the side bars and extending between the end bars, the roll shaft being journaled in the two side bars and the intermediate bars, and each cradling roll being journaled in a side bar and in the adjoining intermediate bar; an angle bracket securable to each end of each intermediate bar and to the adjoining end bar, and adjustable relative to each, for alignment of the roll shaft journals.

4. A power tester for automobiles comprising a mobile frame, means thereon for the support of ground-engaging wheels, whereby the frame may be moved from place to place, an hydraulic absorption dynamometer mounted thereon, a conduit terminating in a hose coupling, carried upon the frame, for the supply of liquid to the dynamometer, valve means on the frame to control discharge of liquid from the dynamometer, pressure means on the frame, terminating in a hose coupling, to indicate torque developed in the dynamometer, rolls journaled in the frame for the support of the driving wheels of an automobile under test, operatively connected to the dynamometer, to drive it, means on the frame terminating in a flexible drive shaft coupling to be rotated by and in accordance with the rotation of said rolls, a torque indicator and a tachometer, a pressure hose extending from the torque indicator and connectable to the hose coupling of the pressure means on the frame, and a flexible drive shaft extending from the tachometer and connectable with the corresponding coupling on the frame.

5. In a machine for testing automobiles, an absorption dynamometer, means whereby the same may be actuated by the motor of an automobile, an oscillatable torque arm constituting a part of said dynamometer, means for measuring the torque produced within the dynamometer, including a pressure member, a plate carrying said pressure member and adjustable transversely of the plane of swing of the torque arm, a second arm pivotally mounted upon said plate, and bearing upon said pressure member, and the torque arm bearing upon said arm, whereby, by adjustment of the plate to vary the effective pressure of the torque arm, through the second arm, upon the pressure member.

CLAUDE C. BENNETT.